(12) United States Patent
Youn et al.

(10) Patent No.: US 8,983,286 B2
(45) Date of Patent: Mar. 17, 2015

(54) METHOD AND APPARATUS FOR PROTECTION SWITCHING IN OPTICAL TRANSPORT NETWORK

(71) Applicant: Electronics and Telecommunications Research Institute, Daejeon (KR)

(72) Inventors: Ji Wook Youn, Daejeon (KR); Jongho Kim, Daejeon (KR); Jong-Yoon Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 45 days.

(21) Appl. No.: 13/672,050

(22) Filed: Nov. 8, 2012

(65) Prior Publication Data

US 2013/0243417 A1    Sep. 19, 2013

(30) Foreign Application Priority Data

Mar. 14, 2012    (KR) ........................ 10-2012-0026294

(51) Int. Cl.
| | | |
|---|---|---|
| G02F 1/00 | (2006.01) | |
| H04B 10/08 | (2006.01) | |
| H04B 17/00 | (2006.01) | |
| H04B 10/00 | (2013.01) | |
| H04B 10/032 | (2013.01) | |
| H04J 14/02 | (2006.01) | |
| H04J 3/16 | (2006.01) | |

(52) U.S. Cl.
CPC .......... *H04B 10/032* (2013.01); *H04J 14/0295* (2013.01); *H04J 3/1664* (2013.01); *H04J 2203/006* (2013.01)
USPC .............. 398/5; 398/3; 398/4; 398/7; 398/17; 398/33; 398/118

(58) Field of Classification Search
USPC ....................... 398/3, 4, 5, 7, 17, 33; 370/118
See application file for complete search history.

(56) References Cited

U.S. PATENT DOCUMENTS

| | | | |
|---|---|---|---|
| 6,530,032 B1 * | 3/2003 | Shew et al. ..................... | 714/4.3 |
| 6,614,754 B1 * | 9/2003 | Usuba et al. .................. | 370/222 |
| 7,184,663 B2 * | 2/2007 | Kinoshita et al. .............. | 398/59 |
| 7,450,497 B2 * | 11/2008 | Trudel et al. ................... | 370/224 |
| 7,613,392 B2 * | 11/2009 | Gerstel ............................ | 398/5 |
| 7,742,502 B2 | 6/2010 | Vissers et al. | |
| 2001/0038473 A1 * | 11/2001 | Li et al. ......................... | 359/110 |
| 2004/0076431 A1 * | 4/2004 | Mueller .......................... | 398/33 |
| 2007/0292129 A1 * | 12/2007 | Yan et al. ......................... | 398/5 |
| 2010/0183301 A1 * | 7/2010 | Shin et al. ....................... | 398/45 |
| 2010/0226648 A1 * | 9/2010 | Katagiri et al. ................. | 398/66 |
| 2011/0142438 A1 | 6/2011 | Youn et al. | |
| 2012/0002965 A1 * | 1/2012 | Bellato et al. .................. | 398/52 |
| 2012/0039609 A1 * | 2/2012 | Dong et al. ..................... | 398/66 |
| 2012/0294610 A1 * | 11/2012 | Genthner et al. .............. | 398/45 |

FOREIGN PATENT DOCUMENTS

KR    1020110068819    6/2011

* cited by examiner

*Primary Examiner* — David Payne
*Assistant Examiner* — Pranesh Barua
(74) *Attorney, Agent, or Firm* — Nelson Mullins Riley & Scarborough LLP

(57) ABSTRACT

A node of an optical transport network system transmits optical wavelengths to an adjacent node through an operational line. An apparatus for protection switching of the optical transport network system transmits only an optical channel with a fault among a plurality of optical channels composed of flexible optical channel data units in an optical wavelength of the operational line, via a reserve line.

12 Claims, 6 Drawing Sheets

METHOD AND APPARATUS FOR PROTECTION SWITCHING IN OPTICAL TRANSPORT NETWORK

CROSS-REFERENCE TO RELATED APPLICATION

This application claims priority to and the benefit of Korean Patent Application No. 10-2012-0026294 filed in the Korean Intellectual Property Office on Mar. 14, 2012, the entire contents of which are incorporated herein by reference.

BACKGROUND OF THE INVENTION (a) Field of the Invention

The present invention relates to a method and apparatus for protection switching in an optical transport network, and more particularly, to a method for protection switching in an optical transport network supporting a flexible optical channel data unit function.

(b) Description of the Related Art

An optical transport network supports a wide bandwidth, high reliability, a well-developed protection switching function, and an operation, administration, and maintenance (OAM) technique. Thus, research into transmitting packet data through an optical transport network, which is currently explosively increasing, is actively ongoing.

In order to effectively receive packet client signals through an optical transport network, ITU-T, an international standardization organization, defined a flexible optical channel data unit (ODUflex) and defined the same so as to be multiplexed through a generic mapping procedure (GMP) in a higher hierarchy ODUk (k=2, 3, 4). The use of the ODUflex technology is advantageous in that bandwidth can be managed for each ODUflex, and bandwidth can be increased or decreased. This allows for effectively receiving packet data having burst characteristics. However, the related art optical transport network technology, which simply multiplexes a signal input from a client interface to a time-division multiplexing (TDM) signal having a higher transfer rate and transmits the same, provides only a protection switching function of a wavelength unit, it is disadvantageous in that a bandwidth set for each ODUflex cannot be effectively operated. Thus, in order to transparently receive Ethernet data and enhance network efficiency, a protection switching function for each optical channel, i.e., for each ODUflex, rather than the current protection switching function of a wavelength unit, in an optical transport network is required.

SUMMARY OF THE INVENTION

The present invention has been made in an effort to provide a method and apparatus for protection switching in an optical transport network having advantages of providing a protection switching function for each flexible optical channel data unit (ODUflex) in an optical transport network.

An exemplary embodiment of the present invention provides a method for protection switching of a transmission node in an optical transport network system. The method for protection switching may include: mapping a signal input from an optical transport network interface to a plurality of first optical channels composed of a flexible optical channel data unit (ODUflux) in an optical wavelength of an operational line and transmitting the same to a reception unit; and performing protection switching only on a first optical channel with a fault among the plurality of first optical channels to a second optical channel having the same bandwidth as that of the first optical channel with a fault among a plurality of second optical channels in an optical wavelength of a reserve line.

The performing may include receiving fault information of the first optical channel with a fault from the reception node.

The performing may include: generating a plurality of optical channel data tributary unit (ODTUk.ts) signals having the same or a smaller bandwidth than that of the first optical channel from the fault information of the first optical channel with a fault received from the reception node; and multiplexing the plurality of ODTUk.ts signals and mapping the multiplexed ODTUk.ts signals to a second optical channel having the same bandwidth as that of the first optical channel with a fault.

The transmitting may include: generating a plurality of ODTUk.ts signals having the same or a smaller bandwidth than that of the first optical channel from the input signal; and multiplexing the plurality of ODTUk.ts signals and mapping the multiplexed ODTUk.ts signals to the plurality of first optical channels.

At least some of the plurality of first optical channels may have different bandwidths, and at least some of the plurality of second optical channels may have different bandwidths.

Another embodiment of the present invention provides a method for protection switching of a reception node in an optical transport network system. The method for protection switching may include: receiving a plurality of first optical channels composed of flexible optical channel data units (ODUflex) in an optical wavelength of an operational line to which the optical wavelength has been mapped by a transmission node; detecting at least one first optical channel with a fault among the plurality of first optical channels; transmitting the fault information of the at least one first optical channel with a fault to the transmission node; and receiving only at least one first optical channel with a fault from the transmission node via a reserve line.

The receiving via the reserve line may include mapping only at least one first optical channel with a fault to at least one second optical channel among a plurality of second optical channels composed of flexible ODUs (ODUflex) in an optical wavelength of the reserve line.

A bandwidth of at least one first optical channel may be to the same as that of at least one second optical channel.

Yet another embodiment of the present invention provides an apparatus for protection switching in an optical transport network system. The apparatus for protection switching may include: a first transmission unit configured to map an input signal to a plurality of first optical channels composed of flexible optical channel data units (ODUflex) in an optical wavelength of an operational line and transmit the same to a reception node; and a protection switching controller configured to switch only a first optical channel with a fault among the plurality of first optical channels of the operational line to a reserve line.

The apparatus may further include a first reception unit configured to detect a first optical channel with a fault among the plurality of first optical channels of the operational line.

The first reception unit may include an optical channel termination unit configured to receive the plurality of first optical channels, generate a plurality of tributary slot signals having the same or a smaller bandwidth than that of the first optical channels, and detect a fault of a plurality of the first optical channels.

The apparatus for protection switching may further include a second reception unit configured to receive at least one second optical channel among a plurality of second optical channels of the reserve line detect fault from the received second optical channel.

The apparatus may further include a second transmission unit configured to map only the first optical channel with a fault to a second optical channel having the same bandwidth as that of the first optical channel with a fault among the plurality of second optical channels composed of flexible optical channel data units (ODUflex) in an optical wavelength of the reserve line, and transmit the same to the reception node.

DETAILED DESCRIPTION OF THE EMBODIMENTS

Figure 1:
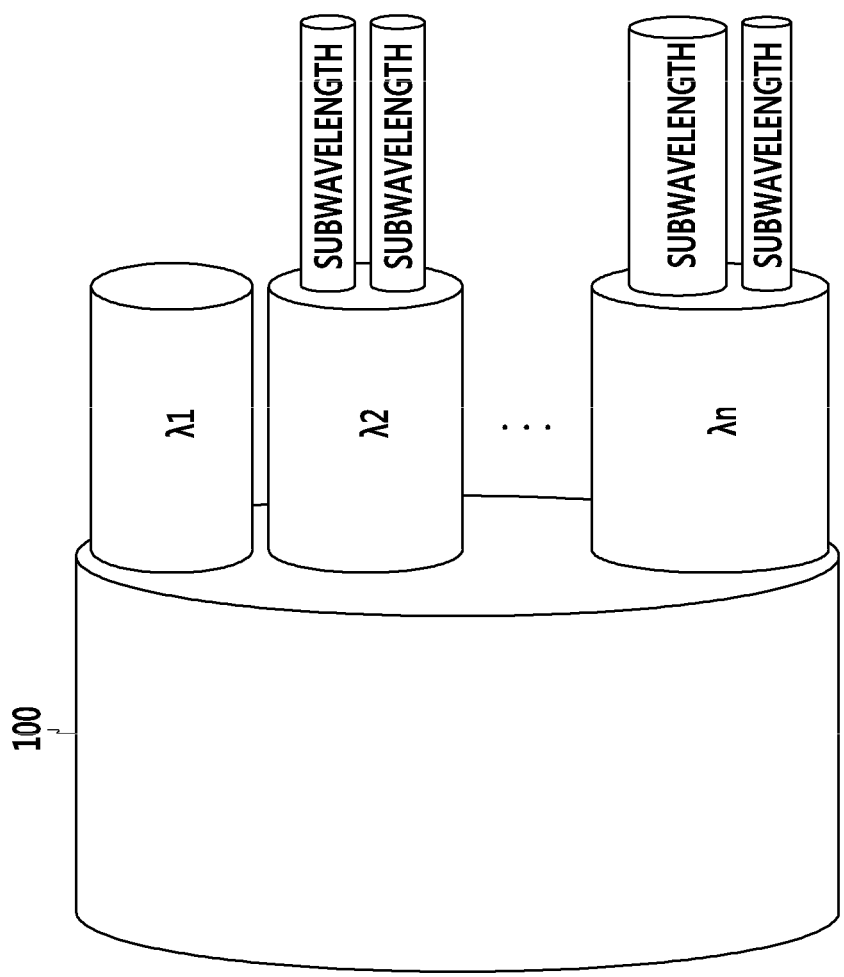
FIG. 1 is a view showing an example of a method of bandwidths assignment in an optical transport network system according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

A method and apparatus for protection switching in an optical transport network according to an embodiment of the present invention will be described in detail with reference to the accompanying drawings.

FIG. 1 is a view showing an example of a method of bandwidths assignment in an optical transport network system according to an embodiment of the present invention.

With reference to FIG. 1, in an optical transport network system, packet data is transmitted through an optical transport network interface 100.

The optical transport network interface 100 includes a plurality of optical wavelengths $\lambda 1$ to $\lambda n$. For example, a bandwidth of a single optical wavelength may be allocated by the wavelength, by the subwavelength, or by the optical channel. Here, the optical wavelength refers to an optical wavelength used in a wavelength division multiplexing (WDM) system. The subwavelength refers to a signal unit multiplexed to an optical wavelength such an STM-N signal or low order ODUk signal excluding a flexible optical channel data unit (ODUflex). The optical channel refers to an ODUflex signal. That is, the sub-wavelength indicates a signal having a fixed bandwidth. Thus, a bandwidth thereof cannot be hitlessly controlled. At least one sub-wavelength can be multiplexed within a single optical wavelength.

Figure 2:
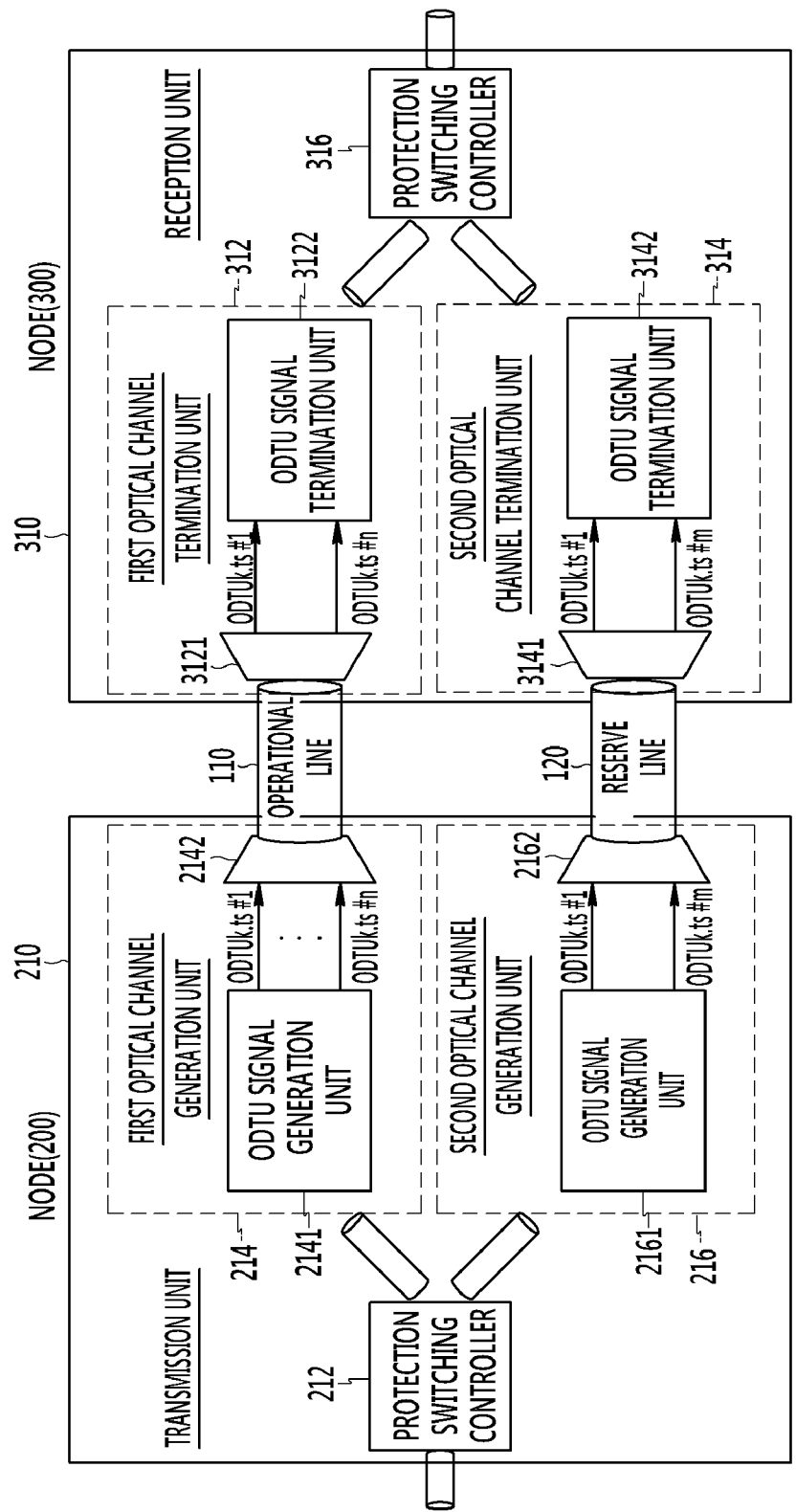
FIG. 2 is a view schematically showing nodes of an optical transport network system for unidirectional optical transmission according to a first embodiment of the present invention.

FIG. 2 is a view schematically showing nodes of an optical transport network system for unidirectional optical transmission according to a first embodiment of the present invention.

With reference to FIG. 2, a node 200 of the optical transport network system is connected to a different node 300 through an optical transport network interface.

The optical transport network interface includes an operational line 110 and a reserve line 120. The operational line 110 and the reserve line 120 include a plurality of optical wavelengths, respectively, and each of the plurality of optical wavelengths includes a plurality of optical channels. Here, each optical channel corresponds to ODUflex. Thus, different bandwidths may be allocated to the respective optical channels.

The node 200 transmits a plurality of optical wavelengths to the node 300 via the operational line 110. When there is a fault in at least one of the optical channels of the operational line, the fault-generated optical channel is switched by an optical channel of a reserve line, thereby providing a real time optical transmission service.

In the optical transport network system for a uni-directional optical transmission, the node 200 includes a transmission unit 210 transmitting an optical wavelength to the node 300, and the node 300 includes a reception unit 310 receiving an optical wavelength from the node 200.

The transmission unit 210 includes a protection switching controller 212, at least one first optical channel generation unit 214, and at least one second optical channel generation unit 216.

The at least one first optical channel generation unit 214 is connected to the operational line 110. Each of at least one first optical channel generation unit 214 corresponds to each of the optical wavelengths of the operational line 110. In FIG. 2, only one first optical channel generation unit 214 is illustrated on the assumption that only a single optical wavelength is included in the operational line 110.

The at least one second optical channel generation unit 216 is connected to the reserve line 120. Each of at least one second optical channel generation unit 216 corresponds to each of the optical wavelengths of the reserve line 120. In FIG. 2, only one second optical channel generation unit 216 is illustrated on the assumption that only a single optical wavelength is included in the reserve line 120.

The protection switching controller 212 transfers signals input to an optical channel with a fault in the operational line 110 to the second optical channel generation unit 216, and transfers signals input to a normal optical channel to the first optical channel generation unit 214 based on fault information regarding each optical channel of the operational line 110. The protection switching controller 212 may receive fault information regarding each optical channel of the operational line 110 from the reception unit 310.

The first optical channel generation unit 214 includes an optical channel data tributary unit (ODTU) signal generation unit 2141 and an ODTU signal multiplexing unit 2142. The second optical channel generation unit 216 includes an ODTU signal generation unit 2161 and an ODTU signal multiplexing unit 2162.

The ODTU signal generation unit 2141 generates a plurality of ODTUk.ts (optical channel data tributary unit) signals (ODTUk.ts #1 to ODTUk.ts #n) having a bandwidth of n×1.25 Gbps. The ODTU signal multiplexing unit 2142 multiplexes the plurality of ODTUk.ts signals (ODTUk.ts #1 to ODTUk.ts #n) generated by the ODTU signal generation unit 2141 and maps the same to corresponding optical channels in the optical wavelength of the operational line. That is, the bandwidths of the optical channels in an optical wavelength of the operational line 110 may be different each other. The optical channels in the optical wavelength of the operational line 110 have a bandwidth of n×1.25 Gbps.

The reserve line 120 is operated when a fault is generated in an optical channel of the operational line 110, and a signal input to the fault-generated optical channel in the operational line 110 is input to the second optical channel generation unit 216.

The ODTU signal generation unit 2161 and the ODTU signal multiplexing unit 2162 of the second optical channel generation unit 216 operate in a similar manner to that of the ODTU signal generation unit 2141 and the ODTU signal multiplexing unit 2142. The ODTU signal generation unit 2161 generates a plurality of ODTUk.ts signals (ODTUk.ts #1 to ODTUk.ts #m) having a bandwidth of n×1.25 Gbps from a signal switched by the protection switching controller 212.

The reception unit 310 includes at least one first optical channel termination unit 312, at least one second optical channel termination unit 314, and a protection switching controller 316.

The at least one first optical channel termination unit 312 is connected to an operational line. Each of at least one first optical channel termination unit 312 corresponds to each of the optical wavelengths of the operational line.

The at least one second optical channel termination unit 314 is connected to the reserve line. Each of at least one second optical channel termination unit 314 corresponds to each of the optical wavelengths of the reserve line.

The first optical channel termination unit 312 includes an ODTU signal demultiplexing unit 3121 and an ODTU signal termination unit 3122. The second optical channel termination unit 314 includes an ODTU signal demultiplexing unit 3141 and an ODTU signal termination unit 3142.

In the first optical channel termination unit 312, the ODTU signal demultiplexing unit 3121 demultiplexes optical wavelengths received through the operational line 110 into the ODTUk.ts signals (ODTUk.ts #1 to ODTUk.ts #n) constituting optical channels in the optical wavelengths. The ODTU signal termination unit 3122 restores a tributary slot signal in units of 1.25 Gbps from the plurality of ODTUk.ts signals (ODTUk.ts #1 to ODTUk.ts #n) and outputs the restored signal to the protection switching controller 316.

Also, the first optical channel termination unit 314 detects a fault from a plurality of optical channels within the optical wavelengths of the operational line 110. If there is a fault in one or more of a plurality of optical channels in a single optical wavelength, the fault of the optical channels is detected by the first optical channel termination unit 312. Thus, the first optical channel termination unit 312 transfers the fault information detected by the optical channel to the protection switching controller 212 of the transmission unit 210 by a scheme determined according to a system operating method. Then, the protection switching controller 212 of the transmission unit 210 switches only the fault-generated optical channel to an optical channel of the reserve line.

The ODTU signal demultiplexing unit 3141 and the ODTU signal termination unit 3142 of the second optical channel termination unit 314 operate in a similar manner to that of the ODTU signal demultiplexing unit 3121 and the ODTU signal termination unit 3122. The ODTU signal demultiplexing unit 3141 demultiplexes the optical wavelengths received through the reserve line 120 into ODTUk.ts signals constituting the optical channels within the optical wavelengths, and the ODTU signal termination unit 3142 restores the tributary slot signal in units of 1.25 Gbps from the plurality of ODTUk.ts signals (ODTUk.ts #1 to ODTUk.ts #m) input from the ODTU signal demultiplexing unit 3121 and outputs the restored tributary slot signal to the protection switching controller 316.

The protection switching controller 316 selectively receives the optical channels ODTUk.ts #1 to ODTUk.ts #n from the first optical channel termination unit 312 and the optical channels ODTUk.ts #1 to ODTUk.ts #m from the second optical channel termination unit 315 based on the fault information detected by the optical channel. That is, although there is a fault in an optical channel of the operational line 110, the reception unit 310 may receive the fault-generated optical channel in the operational line 110 through the optical channel of the reserve line 120.

Figure 3:
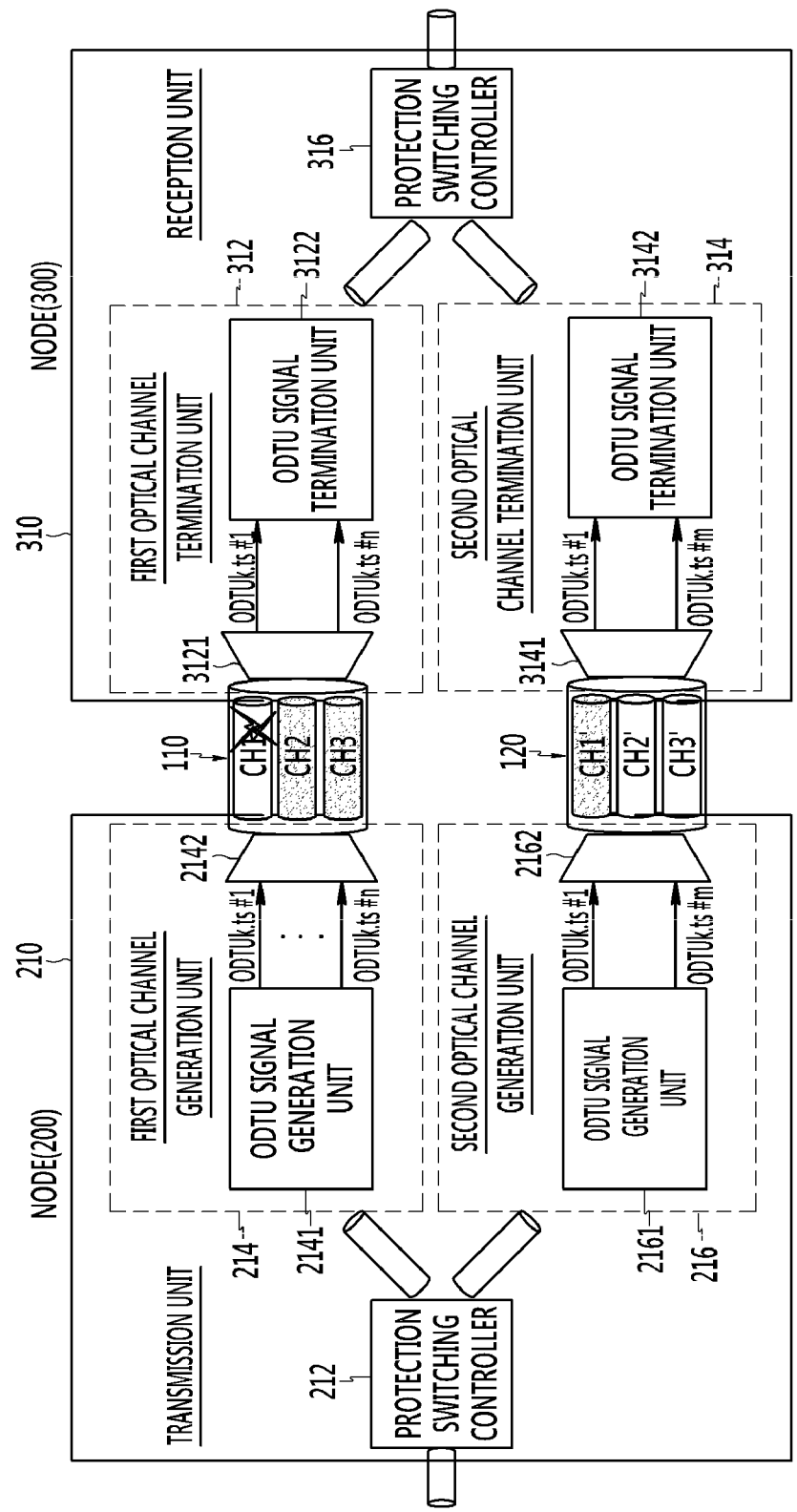
FIG. 3 is a view explaining a method for protection switching in the optical transport network system for unidirectional optical transmission according to the first embodiment of the present invention.
Figure 4:
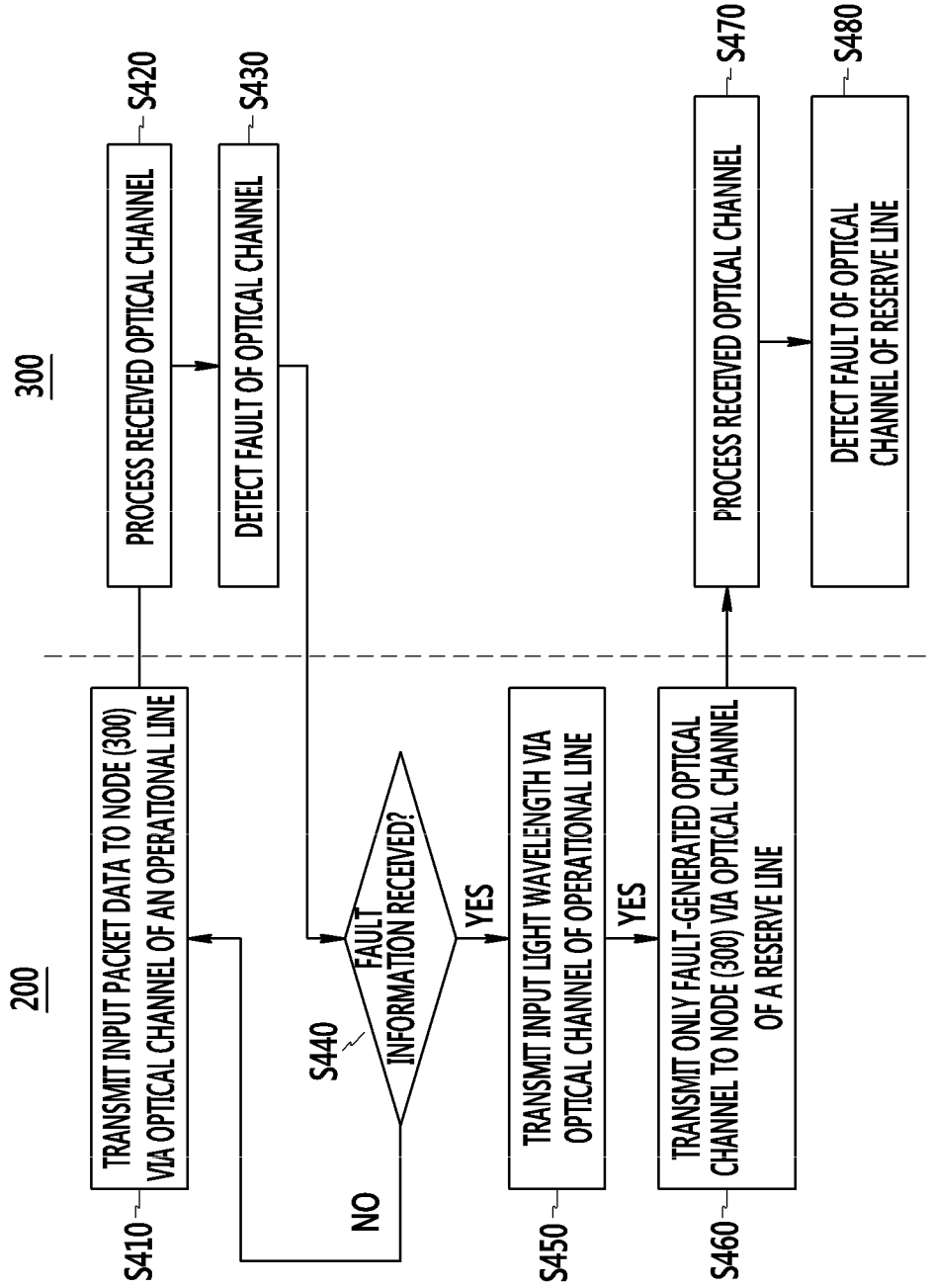
FIG. 4 is a flowchart illustrating a process of a method for protection switching in an optical transport network system for unidirectional optical transmission according to the first embodiment of the present invention.

FIG. 3 is a view explaining a method for protection switching in the optical transport network system for a uni-directional optical transmission according to the first embodiment of the present invention, and FIG. 4 is a flowchart illustrating a process of a method for protection switching in an optical transport network system for a uni-directional optical transmission according to the first embodiment of the present invention.

In FIGS. 3 and 4, for the sake of explanation, only a single optical wavelength of each of the operational line 110 and the reserve line 120 is illustrated, and a single optical wavelength is illustrated to include three optical channels.

With reference to FIG. 4, in a normal state, the node 200 transmits input packet data to the node 300 via optical channels CH1 to CH3 of the operational line 110 (S410).

The first optical channel termination unit 312 of the node 300 receives the optical wavelength and processes the plurality of optical channels included in the received optical wavelength (S420). That is, the first optical channel termination unit 312 demultiplexes optical channels CH1 to CHn from the received optical wavelength, and then generates ODTUk.ts signals (ODTUk.ts #1 to ODTUk.ts #n).

As shown in FIG. 3, if one (CH1) of the plurality of optical channels CH1 to CH3 in a single optical wavelength of the operational line 110 has a fault, the first optical channel termination unit 312 of the node 300 detects the fault of the optical channel CH1 (S430). The first optical channel termination unit 312 of the node 300 transfers the fault information of the optical channel CH1 to the protection switching controller 212 of the node 200.

When the fault information of the optical channel CH1 is received from the first optical channel termination unit 312 of the node 300 (S440), the protection switching controller 212 switches only the optical channel CH1 corresponding to the fault information to the reserve line 120 (S450). That is, the protection switching controller 212 outputs a signal input to the optical channel CH1 with a fault to the second optical channel generation unit 216 connected to the reserve line 120. The second optical channel generation unit 216 generates one or a plurality of ODTUk.ts signals (ODTUk.ts #1 to ODTUk.ts #m) having a bandwidth equal to that of the optical channel CH1, multiplexes the generated ODTUk.ts signals, and maps the same to a single optical channel CH1' in the optical wavelength of the reserve line 120, whereby the signal, which has been transmitted via the optical channel CH1 with a fault, is transmitted to the reception unit 310 via the single optical channel CH1' in an optical wavelength of the reserve line 120.

That is, only the optical channel CH1 detected to have a fault is selectively transmitted via the reserve line 120, and optical channels in a normal state are continuously transmitted via the operational line 110. Here, the optical channel CH1 of the operational channel 110 has a bandwidth equal to that of the optical channel CH1' of the reserve line.

The second optical channel termination unit 314 of the node 300 processes the received optical channel (S470). When there is a fault in an optical channel transmitted via the reserve line 120, the second optical channel termination unit 314 detects the optical channel with a fault and transfers the same to an operation management plane (not shown) according to a method defined in the system (S480).

That is, the first optical channel termination unit 312 demultiplexes the received optical wavelength into optical channels CH2 to CHn, generates the ODTUk.ts signals (ODTUk.ts #1 to ODTUk.ts #n) while the second optical channel termination unit 314 demultiplexes the received optical wavelength into the optical channel CH1, and then generates the ODTUk.ts signals (ODTUk.ts #1 to ODTUk.ts #m).

Thereafter, the protection switching controller 316 of the node 100 receives the ODTUk.ts signals (ODTUk.ts #1 to ODTUk.ts #n) corresponding to the optical channels CH2 to CHn from the first optical channel termination unit 312 based on the fault information of the optical channel CH1, and receives the ODTUk.ts signals (ODTUk.ts #1 to ODTUk.ts #m) corresponding to the optical channel CH1 from the second optical channel termination unit 314.

Figure 5:
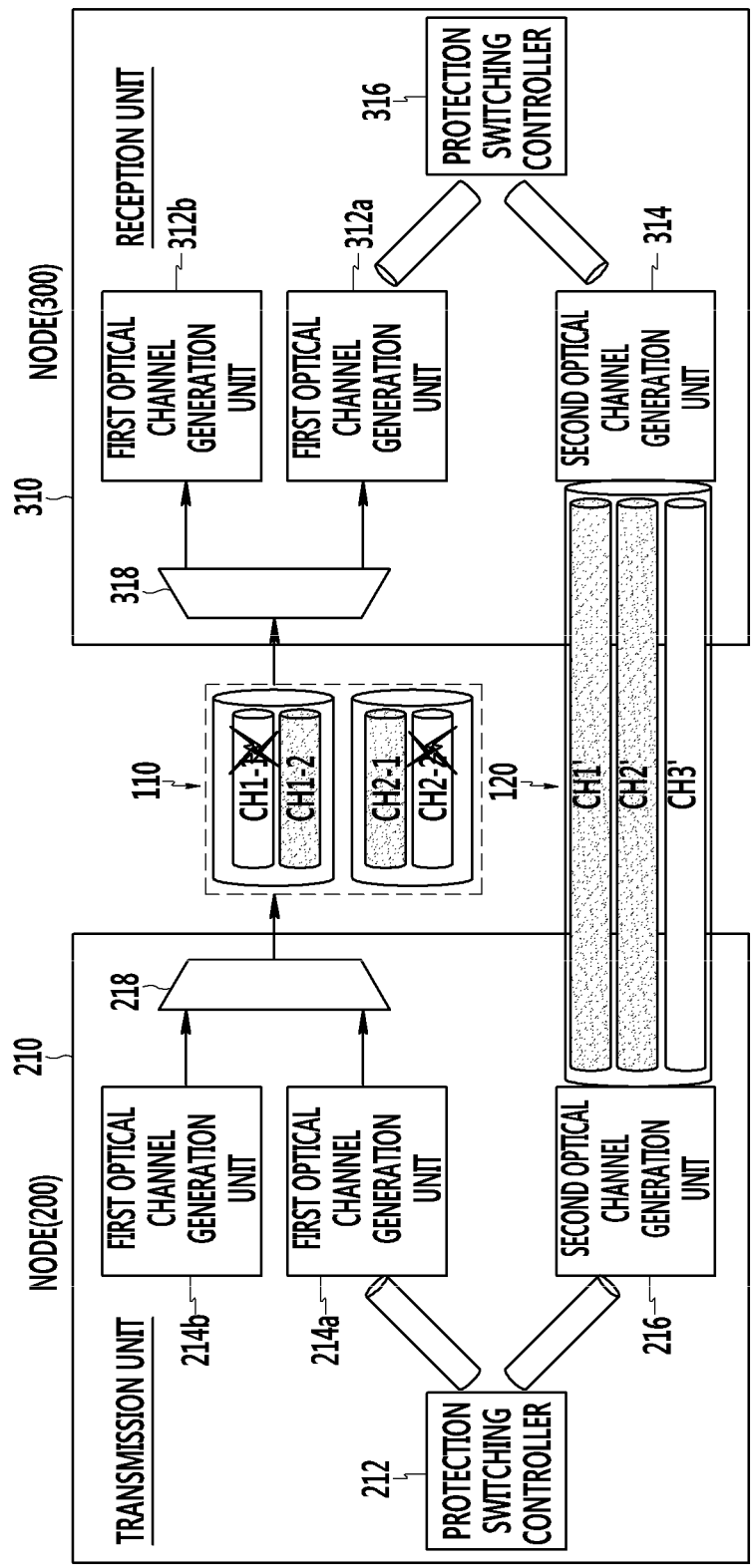
FIG. 5 is a flowchart illustrating a process of a method for protection switching in an optical transport network system for unidirectional optical transmission according to a second embodiment of the present invention.

FIG. 5 is a flowchart illustrating a process of a method for protection switching in an optical transport network system for a uni-directional optical transmission according to a second embodiment of the present invention.

In FIG. 5, it is illustrated that the operational line 110 is comprised of two optical wavelengths, the reserve line 120 is comprised of one optical wavelength, each of the optical wavelengths of the operational line 110 includes two optical channels, and the optical wavelength of the reserve line 120 includes three optical channels.

As shown in FIG. 5, the operational line 110 and the reserve line 120 may include at least one optical wavelength, and the number of the optical wavelengths of the reserve line 120 may be equal to or smaller than that of the optical wavelengths of the operational line 110. In order to enhance transmission efficiency of the optical transport network, the number of optical wavelengths of the reserve line 120 may be set to be smaller than that of the operational line 110, and in order to increase reliability of the optical transport network, the number of optical wavelengths of the reserve line 120 may be set to be equal to that of the operational line 110.

When the operational line 110 is composed of two optical wavelengths, the transmission unit 210 may include first optical channel generation units 214a and 214b to correspond to the two optical wavelengths of the operational line 110, and the reception unit 310 may include first optical channel termination units 312a and 312b to correspond to the two optical wavelengths of the operational line 110. Also, the transmission unit 210 may further include an optical multiplexing unit 218 for multiplexing optical outputs from the first optical channel generation units 214a and 214b, and the reception unit 310 may also further include an optical demultiplexing unit 318 corresponding to the optical multiplexing unit 218.

The optical transport network system having such a structure may also perform protection switching in the same manner as that of the optical transport network system illustrated in FIG. 3.

Input packet data is transmitted through the operational line 110 in a normal state. As shown in FIG. 5, if there is a fault in an optical channel CH1-1 of the first optical wavelength and in an optical channel CH2-2 of the second optical wavelength among the optical channels in the two optical wavelengths through the operational line 110, the first optical channel termination units 312a and 312b detect the fault of the optical channel CH1-1 and the optical channel CH2-2 and transfer fault information of the optical channel CH1-1 and the optical channel CH2-2 to the protection switching controller 212, respectively.

When the fault information is received from the first optical channel termination units 312a and 312b, the protection switching controller 212 switches only the optical channels CH1-1 and CH2-2 corresponding to the fault information to the reserve line 120. That is, the protection switching controller 212 outputs only a signal input to the optical channels CH1-1 and CH2-2 corresponding to the fault information to the second optical channel generation unit 216. Then, the second optical channel generation unit 216 generates one or a plurality of ODTUk.ts signals (ODTUk.ts #1 to ODTUk.ts #m) having a bandwidth equal to that of the optical channels CH1-1 and CH2-2, multiplexes the generated ODTUk.ts signals, and maps the same to the optical channels CH1' and CH2' of the reserve line. Here, the optical channels CH1-1 and CH2-2 of the operational line have a bandwidth equal to that of the optical channels CH1' and CH2' of the reserve line 120.

Meanwhile, in FIGS. 2 to 5, for the sake of explanation, the optical transport network system for a uni-directional optical transmission is illustrated, but, in general, the nodes 200 and 300 may transmit and receive optical wavelengths. Thus, the nodes 200 and 300 are configured as shown in FIG. 6.

Figure 6:
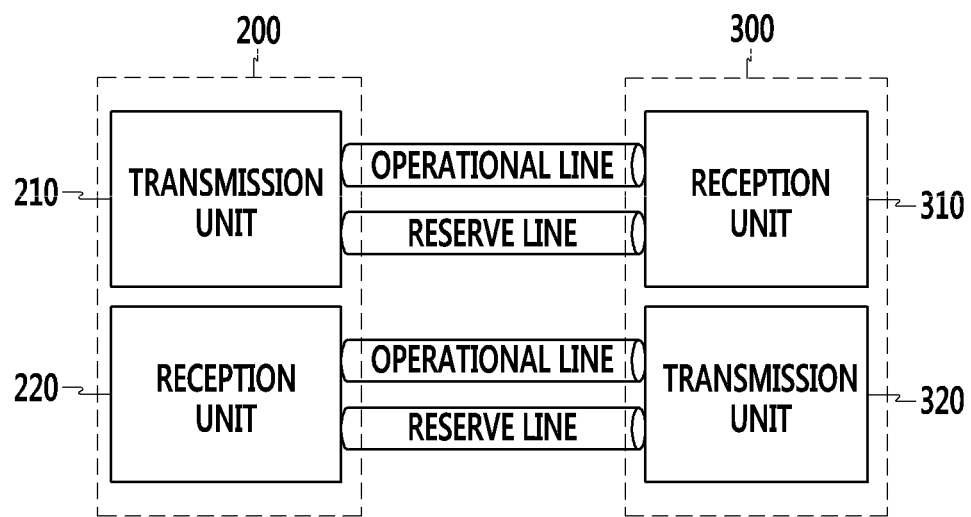
FIG. 6 is a view schematically showing an optical transport network system for bi-directional optical transmission according to a third embodiment of the present invention.

FIG. 6 is a view schematically showing an optical transport network system for bi-directional optical transmission according to a third embodiment of the present invention.

With reference to FIG. 6, the nodes 200 and 300 include transmission units 210 and 320 and reception units 220 and 310, respectively.

The reception unit 220 of the node 200 may be configured to be identical to the reception unit 310 of the node 300, and the transmission unit 320 of the node 300 may be configured to be identical to the transmission unit 210 of the node 200.

The transmission unit 210 of the node 200 and the reception unit 310 of the node 300 may be connected to one operational line and one reserve line, and the reception unit 220 of the node 200 and the transmission unit 320 of the node 300 may be connected to another operational line and another reserve line.

The method for protection switching performed between the reception unit 220 of the node 200 and the transmission unit 320 of the node 300 may be performed in the same manner as that of the method for protection switching performed between the transmission unit 210 of the node 200 and the reception unit 310 of the node 300.

Figure 7:
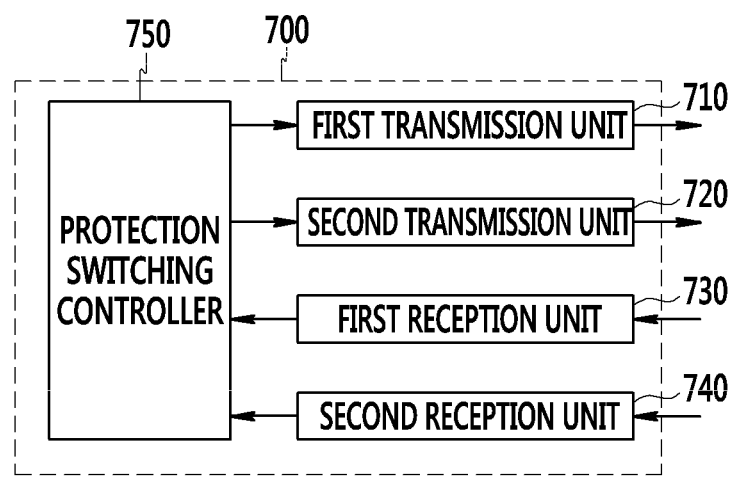
FIG. 7 is a view showing an apparatus for protection switching in an optical transport network system according to an embodiment of the present invention.

FIG. 7 is a view showing an apparatus for protection switching in an optical transport network system according to an embodiment of the present invention.

With reference to FIG. 7, an apparatus 700 for protection switching in an optical transport network system includes a first transmission unit 710, a second transmission unit 720, a first reception unit 730, a second reception unit 740, and a protection switching controller 750.

The first transmission unit 710 generates a plurality of ODTUk.ts signals (ODTUk.ts #1 to ODTUk.ts #n), multiplexes the generated ODTUk.ts signals, and maps the same to optical channels in an optical wavelength of the operational line 110, to thereby transmit packet data input to the node 200 to another node 300. The first transmission unit 710 corresponds to the optical channel generation units 214, 214a, and 214b of the transmission unit 210 illustrated in FIGS. 3 and 5.

The first reception unit 730 receives a plurality of optical wavelengths from the operational line 110, and detects an optical channel with a fault among the plurality of optical channels constituting the plurality of received optical wavelengths. The reception unit 730 corresponds to the first channel termination units 312, 312a, and 312b of the reception unit 310 illustrated in FIGS. 3 and 5.

The second reception unit 740 receives a plurality of optical wavelengths from the reserve line 120 and detects an optical channel with a fault among optical channels constituting the plurality of received optical wavelengths. The second reception unit 740 may correspond to the second optical channel termination unit 314 of the reception unit 310 in FIGS. 3 and 5. The protection switching controller 750 switches only the optical channel with a fault among the plurality of optical channels of the operational channel 110 into an optical channel of the reserve line 120. That is, the protection switching controller 750 transfers only the optical channel with a fault to the second optical channel generation unit 216 connected to the reserve line 120. The protection switching controller 750 corresponds to the protection switching controller 212 of the transmission unit 210 or the protection switching controller 316 of the reception unit 310 illustrated in FIGS. 3 and 5.

When information regarding the optical channel with a fault in the operational line 110 is received from the protection switching controller 750, the second transmission unit 720 generates one or more ODTUk.ts signals (ODTUk.ts #1 to ODTUk.ts #m) having a bandwidth equal to that of the optical channel with a fault, multiplexes the generated ODTUk.ts signals, and maps the same to the optical channels in the optical wavelength of the reserve line 120, thereby transmitting the optical channel with a fault to the node 300 through the reserve line 120. The second transmission unit 720 corresponds to the second optical channel generation unit 216 of the transmission unit 210 illustrated in FIGS. 3 and 5.

According to an embodiment of the present invention, since a protection switching function by the optical channel is provided, restrictions of a protection switching function in units of wavelengths can be solved.

In particular, by providing a protection switching function appropriate for managing a bandwidth in units of flexible optical channel data units (ODUflex), an effective network operation can be performed in an optical transport network having a bandwidth in units of ODUflex.

The embodiments of the present invention may not necessarily be implemented only through the foregoing devices and/or methods, but may also be implemented through a program for realizing functions corresponding to the configurations of the embodiments of the present invention, a recording medium including the program, or the like, and such an implementation may be easily made by a skilled person in the art to which the present invention pertains from the foregoing description of the embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for protection switching of a transmission node in an optical transport network system, the method comprising:

mapping a signal input from an optical transport network interface to a plurality of first optical channels comprised of flexible optical channel data unit (ODUflex) in an optical wavelength of an operational line and transmitting the same to a reception unit; and performing protection switching on a first optical channel with a fault, among the plurality of first optical channels, to a second optical channel having the same bandwidth as that of the first optical channel with the fault, among a plurality of second optical channels in an optical wavelength of a reserve line, wherein the performing comprises:

generating a plurality of optical channel data tributary unit (ODTUk.ts) signals having a same or a smaller bandwidth than that of the first optical channel from fault information of the first optical channel with the fault received from a reception node; and multiplexing the plurality of ODTUk.ts signals and mapping the multiplexed ODTUk.ts signals to the second optical channel having the same bandwidth as that of the first optical channel with the fault.

2. The method of claim 1, wherein the performing comprises receiving the fault information of the first optical channel with a fault from the reception node.

3. The method of claim 1, wherein the transmitting comprises:

generating a plurality of ODTUk.ts signals having the same or a smaller bandwidth than that of the first optical channel from the input signal; and multiplexing the plurality of ODTUk.ts signals and mapping the multiplexed ODTUk.ts signals to the plurality of first optical channels.

4. The method of claim 1, wherein at least some of the plurality of first optical channels have different bandwidths, and at least some of the plurality of second optical channels have different bandwidths.

5. A method for protection switching of a reception node in an optical transport network system, the method comprising:

receiving a plurality of first optical channels comprised of flexible optical channel data units (ODUflex) in an optical wavelength of an operational line to which the optical wavelength has been mapped by a transmission node;

detecting at least one first optical channel with a fault among the plurality of first optical channels;

transmitting fault information of the at least one first optical channel with a fault to the transmission node; and receiving only the at least one first optical channel with the fault from the transmission node via a reserve line, wherein a bandwidth of the at least one first optical channel is the same as that of at least one second optical channel, wherein a plurality of optical channel data tributary unit (ODTUk.ts) signals having a same or a smaller bandwidth than that of the at least one first optical channel with the fault information received from the reception node; and multiplexing the plurality of ODTUk.ts signals and mapping the multiplexed ODTUk.ts signals to the at least one second optical channel having the same bandwidth as that of the first optical channel with the fault.

6. The method of claim 5, wherein the receiving via the reserve line comprises mapping only the at least one first optical channel with the fault to the at least one second optical channel among a plurality of second optical channels comprised of flexible ODUs (ODUflex) in an optical wavelength of the reserve line.

7. The method of claim 6, wherein at least some of the plurality of first optical channels have different bandwidths, and at least some of the plurality of second optical channels have different bandwidths.

8. An apparatus for protection switching in an optical transport network system, the apparatus comprising:

a first transmission unit configured to map an input signal to a plurality of first optical channels comprised of flexible optical channel data units (ODUflex) in an optical wavelength of an operational line and transmit the same to a reception node, wherein the first transmission unit and a second transmission unit both comprise:

an optical channel data tributary unit (ODTU) signal generation unit configured to generate a plurality of optical channel data tributary units (ODTUk.ts) signals having a same or a smaller bandwidth than that of the plurality of first optical channels and second optical channels from the input signal; and an ODTU signal multiplexing unit configured to multiplex the plurality of ODTUk.ts signals and map the multiplexed plurality of ODTUk.ts signals to the corresponding first optical channels and second optical channels; and a protection switching controller configured to switch only a first optical channel with a fault among the plurality of first optical channels of the operational line to a reserve line.

9. The apparatus of claim 8, further comprising a first reception unit configured to detect a first optical channel with a fault among the plurality of first optical channels of the operational line.

10. The apparatus of claim 9, wherein the first reception unit comprises an optical channel termination unit configured to receive the plurality of first optical channels, generate a plurality of tributary slot signals having the same or a smaller bandwidth than that of the first optical channels, and detect a fault of a plurality of the first optical channels.

11. The apparatus of claim 9, further comprising a second reception unit configured to receive at least one second optical channel among a plurality of second optical channels of the reserve line and detect fault from the received second optical channel.

12. The apparatus of claim 8, further comprising the second transmission unit configured to map only the first optical channel with a fault to a second optical channel having the same bandwidth as that of the first optical channel with a fault among the plurality of second optical channels comprised of flexible optical channel data units (ODUflex) in an optical wavelength of the reserve line, and transmit the same to the reception node.

* * * * *